UNITED STATES PATENT OFFICE.

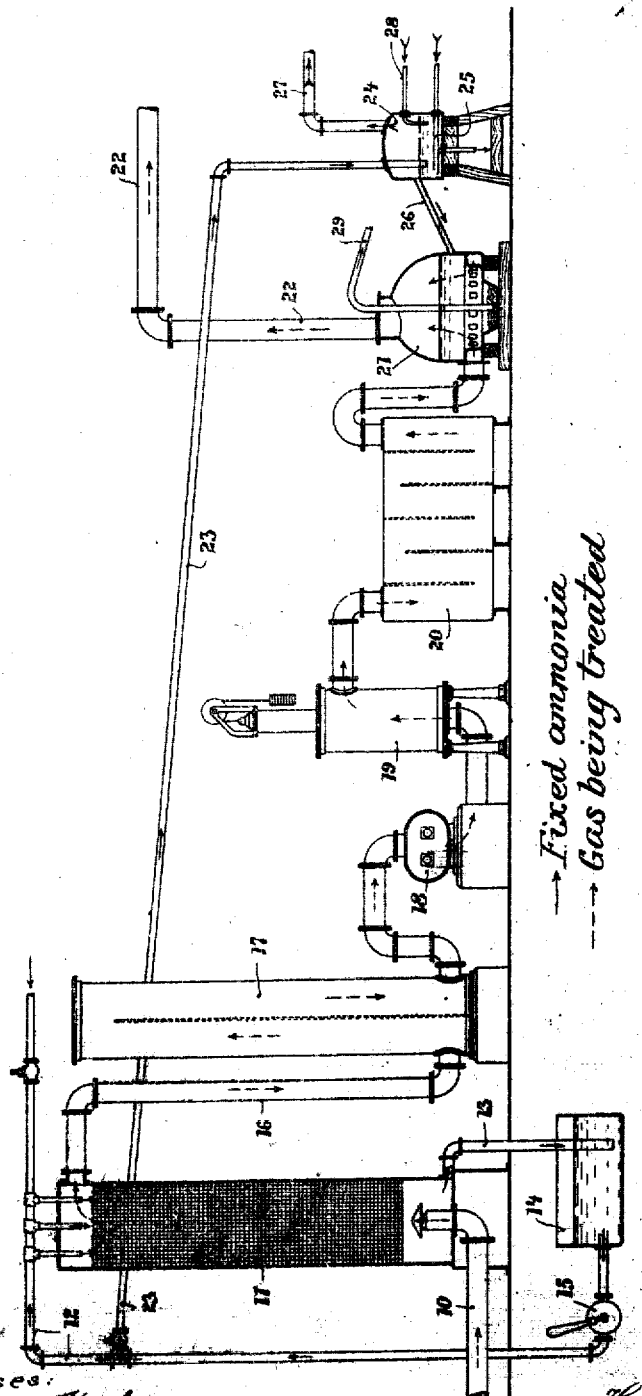

HEINRICH KOPPERS, OF ESSEN, GERMANY.

PROCESS OF RECOVERING AMMONIA FROM GASES.

1,013,404.  Specification of Letters Patent.  Patented Jan. 2, 1912.

Application filed July 22, 1910. Serial No. 573,166.

*To all whom it may concern:*

Be it known that I, HEINRICH KOPPERS, residing at Essen, Germany, and a citizen of Germany, have invented a new and useful Process of Recovering Ammonia from Gases, of which the following is a specification.

This invention relates to a process of recovering ammonia from gases generated by the dry distillation or gasification of fuel, and its object is to provide means whereby the so-called fixed ammonia, *i. e.* ammonia combined with acids, is obtained without the addition of lime as heretofore generally practiced. It is well known that besides causing difficulties in working, the lime has the disadvantage of forming noxious waste water. If the gas containing fixed ammonia is passed into the saturator, hydrochloric acid is set free which energetically attacks the pipes and appliances.

According to the present invention the ammonia compounds are separated by washing the gases with hot water or with a hot solution of ammonium chlorid, when the gases have a temperature near the dew-point of water-saturation (approximately 80° C.). The resultant ammonium chlorid solution is continuously reused, a portion being drawn off and treated for the separation of fixed ammonia. This treatment of the solution may consist in evaporation of the solvent, to separate the chlorid of ammonium as a commercial article, or the hydrochloric acid may be expelled by adding sulfuric acid to the solution. Thus by the treatment of the fixed ammonium compounds as well as by that of the free ammonia, there is formed ammonium sulfate, which may be added together in the form of a liquid or as a solid salt.

The accompanying drawing represents an elevation of an apparatus for carrying out my invention.

The gases flowing through pipe 10 to washer 11 are freed in the latter from fixed ammonia, by the action of hot water discharged from pipe 12. This water is converted into a gradually enriched brine by repeated reuse with fresh gases, said brine containing chiefly ammonium chlorid. From washer 11 the liquid flows through a pipe 13 into a sump tank 14, whence it is returned to washer 11 by a pump 15, thus effecting a continuous circulation. The gases freed from fixed ammonia flow through pipe 16 into cooler 17, and are then forced by pump 18 through a tar-separator 19. The gases which are thus also freed from tar are now reheated in a superheater 20 and conveyed to a saturator 21. Here the gases are caused to give off their residual ammonia in the form of solid ammonium sulfate. The gases pass out of the saturator through pipe 22, the salt being withdrawn through pipe 29. A pipe 23 communicating with pipe 12 receives part of the salt-solution pumped from tank 14, and delivers it to a vessel 24, to which sulfuric acid is supplied from pipe 28. This mixture is heated by steam-coil 25, thus yielding ammonium sulfate. The latter in solution is by pipe 26 conveyed to the saturator 21, while the residual vapors (being mainly vapors of hydrochloric acid) leave vessel 24 through a pipe 27 without coming into contact with the main stream of gas. These vapors may be discharged into the atmosphere, or may be utilized if desired.

With the temperature maintained in the washer 11, most of the tar is condensed into a fog and floats within the gases, while the fixed ammonium compounds are in a solid form. Only a small proportion of free ammonia is absorbed during the washing with the hot liquid, the absorbing capacity of said liquid for ammonia being limited and no undesirable cooling of the gases taking place. The water lost from the brine by evaporation in the course of circulation is preferably replaced whenever necessary by slightly lowering the temperature in washer 11, so that part of the water contained in the gases is precipitated therefrom.

I claim:

1. The process of recovering free and combined ammonia from gases produced in the dry distillation of fuels, which consists in first washing the gases near the dew point of water saturation with a circulating body of water, thus forming a solution containing the fixed ammonia from said gases, conducting the said washed gases to a saturation bath containing sulfuric acid, treating the solution of the fixed ammonia with sulfuric acid at a temperature sufficient to drive off other acids contained therein, and conveying the solution of ammonium sulfate thus obtained, into said saturation bath.

2. The process of recovering free and combined ammonia from gases produced in the dry distillation of fuels, which consists in first washing the gases near the dew point of water saturation with a circulating body of water, thus forming a solution containing the fixed ammonia from said gases, conducting the said washed gases to a saturation bath containing sulfuric acid, treating the solution of the fixed ammonia with sulfuric acid at a temperature sufficient to drive off other acids contained therein, and conveying the ammonium sulfate thus obtained into said saturation bath.

3. The process of recovering free and combined ammonia from gases produced in the dry distillation of fuels, which consists in first washing the gases near the dew point of water saturation with a circulating body of water, thus forming a solution containing the fixed ammonia from said gases, conducting the said washed gases to a saturation bath containing sulfuric acid, treating the solution of the fixed ammonia with sulfuric acid at a temperature sufficient to drive off other acids contained therein, and conveying the ammonium sulfate thus produced and which still contains acid into said saturation bath.

HEINRICH KOPPERS. [L. S.]

Witnesses:
CHAS. J. WRIGHT,
WALTER VONNEGUT.